US010517266B2

(12) United States Patent
Northrop

(10) Patent No.: US 10,517,266 B2
(45) Date of Patent: Dec. 31, 2019

(54) DECORATIVE KENNEL

(71) Applicant: Doskocil Manufacturing Company, Inc., Arlington, TX (US)

(72) Inventor: Melaney Northrop, Arlington, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 0 days.

(21) Appl. No.: 15/260,499

(22) Filed: Sep. 9, 2016

(65) Prior Publication Data

US 2017/0071149 A1   Mar. 16, 2017

Related U.S. Application Data

(60) Provisional application No. 62/216,410, filed on Sep. 10, 2015.

(51) Int. Cl.
*A01K 1/03*   (2006.01)

(52) U.S. Cl.
CPC ................... *A01K 1/034* (2013.01)

(58) Field of Classification Search
CPC .......... A01K 1/034; A01K 1/035; A01K 1/03; A01K 1/032; A01K 1/033; A01K 1/02
USPC ....... 119/416, 452, 459, 462, 472, 473, 474, 119/482; D30/108, 112, 116, 119
See application file for complete search history.

(56) References Cited

U.S. PATENT DOCUMENTS

| | | | | |
|---|---|---|---|---|
| 296,912 | A * | 4/1884 | Bishop | G09F 7/00 |
| | | | | 119/467 |
| 1,154,384 | A * | 9/1915 | Crucet | B29C 73/10 |
| | | | | 119/467 |
| D80,036 | S * | 12/1929 | Little | 119/459 |
| D80,327 | S * | 1/1930 | Little | 119/459 |
| D80,524 | S * | 2/1930 | Greene | 119/459 |
| D86,381 | S * | 3/1932 | Little | 119/459 |
| 1,926,491 | A * | 9/1933 | Little | A01K 31/06 |
| | | | | 119/462 |
| 2,153,081 | A * | 4/1939 | Goodale | E04H 15/006 |
| | | | | 135/115 |
| 2,510,999 | A * | 6/1950 | Oldofredi | B29C 33/08 |
| | | | | 101/28 |
| 2,530,148 | A * | 11/1950 | Bjorklund | A01K 31/08 |
| | | | | 119/474 |
| 3,234,908 | A * | 2/1966 | Doskocil | B65D 85/50 |
| | | | | 119/496 |
| 3,697,363 | A * | 10/1972 | Martinez | A47B 95/00 |
| | | | | 312/204 |
| 3,907,513 | A * | 9/1975 | Sheinberg | B01D 29/01 |
| | | | | 428/549 |

(Continued)

FOREIGN PATENT DOCUMENTS

| | | | | |
|---|---|---|---|---|
| FR | 2703215 A1 | * | 10/1994 | ............. A01K 1/035 |
| GB | 2524647 A | * | 9/2015 | ......... E04B 1/34336 |
| WO | WO-2018169693 A1 | * | 9/2018 | ............. A01K 1/033 |

*Primary Examiner* — Magdalena Topolski
*Assistant Examiner* — Morgan T Barlow
(74) *Attorney, Agent, or Firm* — Global IP Counselors, LLP

(57) ABSTRACT

A kennel includes a plurality of vertical wire members, and a decorative panel extending between first and second vertical wires of the plurality of vertical wire members, the decorative panel having first and second edges, the decorative panel being attached to first and second wires at the first and second edges.

5 Claims, 4 Drawing Sheets

(56) References Cited

U.S. PATENT DOCUMENTS

| | | | | |
|---|---|---|---|---|
| 4,282,829 A * | 8/1981 | Tweed | | A01K 1/035 119/452 |
| D282,880 S * | 3/1986 | Barati | | D30/114 |
| 4,909,188 A * | 3/1990 | Tominaga | | A01K 1/03 119/474 |
| 5,526,598 A * | 6/1996 | Watanabe | | G09F 7/18 248/222.52 |
| D435,703 S * | 12/2000 | Coudare | | D30/108 |
| 6,155,206 A * | 12/2000 | Godshaw | | A01K 1/0245 119/453 |
| 6,457,438 B1 * | 10/2002 | Baker | | A01K 1/034 119/452 |
| 6,997,138 B1 * | 2/2006 | Simpson | | A01K 1/033 119/474 |
| 7,240,637 B2 * | 7/2007 | Rosen | | A01K 3/00 119/523 |
| 7,481,182 B2 * | 1/2009 | Simpson | | A01K 1/0125 119/168 |
| D608,056 S * | 1/2010 | Evans | | D30/108 |
| D640,837 S * | 6/2011 | Henley | | D30/108 |
| 8,733,292 B2 * | 5/2014 | Nichols | | A01K 1/03 119/452 |
| 9,038,638 B1 * | 5/2015 | Cabrera | | A61F 5/3776 128/869 |
| 9,267,323 B2 * | 2/2016 | Whooley | | E06B 9/02 |
| 9,301,493 B2 * | 4/2016 | Renforth | | A01K 1/0254 |
| 9,421,932 B2 * | 8/2016 | Renforth | | B60R 21/026 |
| 9,521,826 B2 * | 12/2016 | Rybka | | A01K 15/02 |
| 9,788,524 B2 * | 10/2017 | Veness | | A01K 1/0245 |
| D808,596 S * | 1/2018 | Veness | | D30/108 |
| 2002/0020361 A1 * | 2/2002 | Granda | | A01K 31/06 119/459 |
| 2003/0107031 A1 * | 6/2003 | Cuzzocrea | | A01K 3/00 256/25 |
| 2003/0145799 A1 * | 8/2003 | Hays | | A01K 1/034 119/502 |
| 2004/0194723 A1 * | 10/2004 | Farmer | | A01K 1/0254 119/474 |
| 2004/0205892 A1 * | 10/2004 | Raphael-Davis | | A47D 7/00 5/93.1 |
| 2005/0014429 A1 * | 1/2005 | Tueshaus | | B29C 70/688 442/6 |
| 2008/0087228 A1 * | 4/2008 | Beaty Bishop | | A01K 1/033 119/416 |
| 2009/0031964 A1 * | 2/2009 | Proxmire | | A01K 1/033 119/484 |
| 2009/0314220 A1 * | 12/2009 | Groh | | A01K 1/03 119/502 |
| 2011/0041774 A1 * | 2/2011 | Northrop | | A01K 1/0245 119/497 |
| 2011/0226190 A1 * | 9/2011 | Lamontagne | | A01K 1/033 119/482 |
| 2012/0000430 A1 * | 1/2012 | Rauch | | A01K 1/034 119/416 |
| 2012/0145087 A1 * | 6/2012 | Nichols | | A01K 1/03 119/474 |
| 2013/0192533 A1 * | 8/2013 | Lamke | | A01K 1/033 119/499 |
| 2013/0247338 A1 * | 9/2013 | Santin | | F16B 2/22 24/545 |
| 2014/0034525 A1 * | 2/2014 | Wolf | | A01K 1/03 206/223 |
| 2014/0109839 A1 * | 4/2014 | Cantwell | | A01K 1/034 119/481 |
| 2014/0178628 A1 * | 6/2014 | Hoffmann | | A01K 1/035 428/100 |
| 2014/0352626 A1 * | 12/2014 | Kellogg | | A01K 1/034 119/498 |
| 2014/0352627 A1 * | 12/2014 | Kellogg | | A01K 1/0245 119/498 |
| 2014/0352628 A1 * | 12/2014 | Kellogg | | A01K 1/0245 119/498 |
| 2015/0056400 A1 * | 2/2015 | Abrams | | B44C 1/28 428/67 |
| 2015/0351363 A1 * | 12/2015 | Nussbaum | | A01K 1/035 119/480 |
| 2016/0057969 A1 * | 3/2016 | Kellogg | | A01K 1/034 119/474 |
| 2016/0081299 A1 * | 3/2016 | Wesley | | A01K 1/03 119/452 |
| 2016/0176229 A1 * | 6/2016 | Alvarez Feros | | B05F 1/02 428/196 |
| 2017/0071149 A1 * | 3/2017 | Northrop | | A01K 1/034 |

* cited by examiner

DECORATIVE KENNEL

CROSS REFERENCE TO RELATED APPLICATIONS

This application claims the benefit of U.S. Provisional Application Ser. No. 62/216,410, filed Sep. 10, 2015, the entire contents of which are hereby incorporated by reference.

BACKGROUND

Field of the Invention

The present invention generally relates to kennels. More specifically, the present invention relates to a kennels having a decorative portion, resulting in kennels that are aesthetically pleasing.

Background Information

A long-standing practice exists for housing animals in kennels. In particular, portable kennels have been used to transport animals over various distances. For example, portable kennels are used to secure animals for transportation from one location to another on commercial carriers, such as airplanes, ships, and buses. Furthermore, these kennels are used to transport animals over shorter distances, such as from a home to a veterinary clinic. These portable kennels may also be used for securing an animal indoors for a short period of time.

Additionally, many kennels are disposed within homes or in areas that are visible for pets and other animals. Some pet or animal owners position the kennel in an area frequented by the pet or animal owner to enable the pet or animal to be disposed within the kennel, but still be in the same area or room as the pet or animal owner.

SUMMARY

It has been found that a need exists for a kennel that is aesthetically pleasing. In particular, it has been found that a need exists for a kennel that can be positioned within a home or other area for an animal and be aesthetically pleasing to the owner and the animal.

Such a kennel includes a plurality of vertical wire members, and a decorative panel extending between first and second vertical wires of the plurality of vertical wire members. The decorative panel has first and second edges, and is attached to first and second wires at the first and second edges.

DETAILED DESCRIPTION OF EMBODIMENTS

Selected embodiments will now be explained with reference to the drawings. It will be apparent to those skilled in the art that the decorative kennel improves the aesthetic appearance of a kennel. Moreover, the decorative kennel does not reduce the animal's ability to observe the outside of the kennel or cause the animal to be enclosed in a solid or mostly solid kennel.

Figure 1:
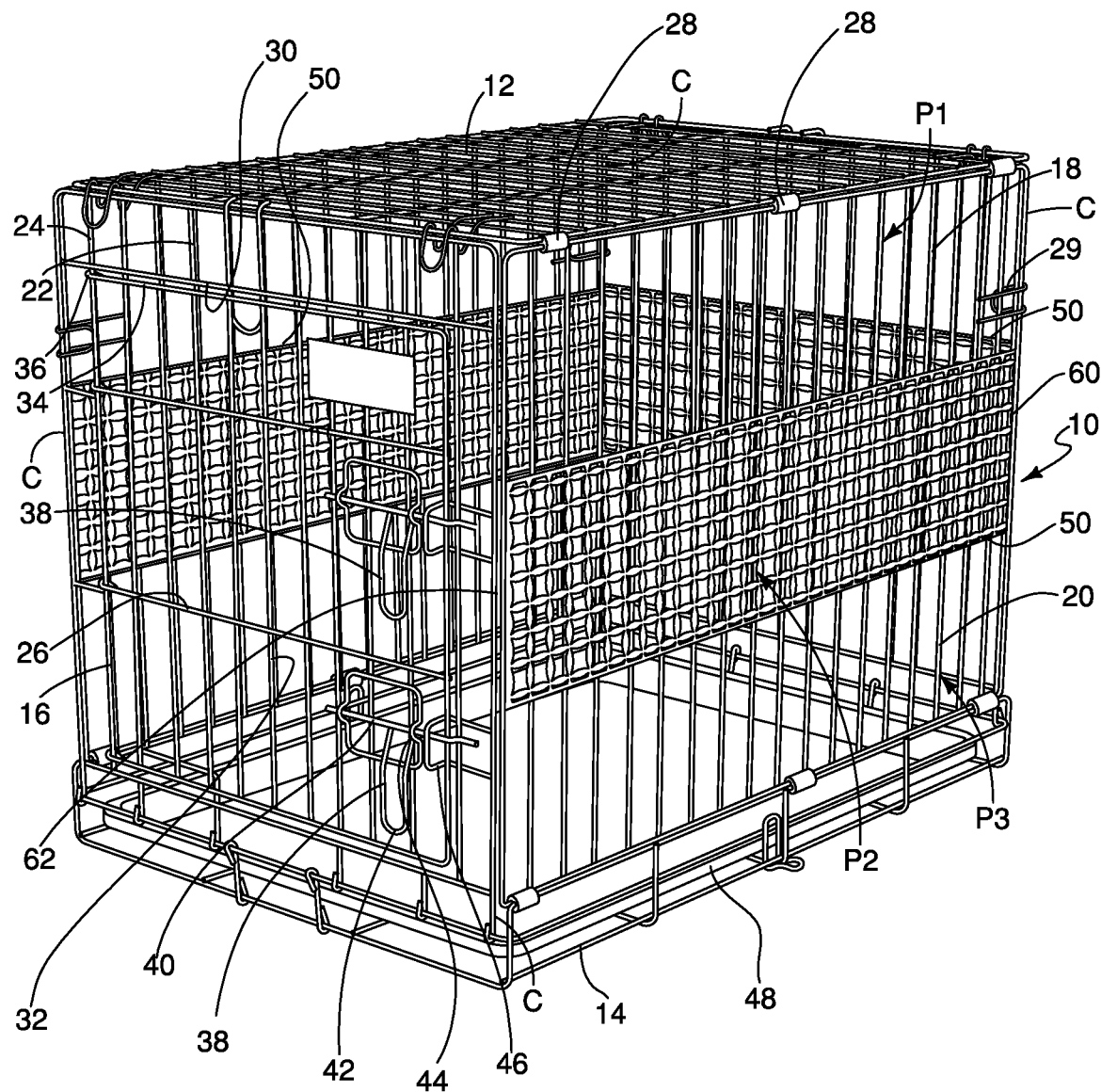
FIG. 1 is a top perspective view of a decorative kennel according to one embodiment of the present invention.

As shown in FIG. 1, preferably the animal kennel 10 is a metal wire kennel 10. However, the animal kennel 10 can be a metal, wire, plastic, or fabric enclosure with a door in which an animal may be kept for security or transportation. Animal kennels can be designed to replicate the natural den of a dog or other animal and as such can provide the dog or animal with a place of refuge at home or when traveling to new surroundings. Additionally, animal kennels can be used for toilet training a new puppy, taking a dog on short trips inside the car, displaying a dog at a dog show, or giving a dog a place to go when visitors come to the house. Occasionally, using a kennel for an animal can be similar to having a playpen for a toddler or a crib for a baby, and allows the owner to take their eyes off their pet.

However, frequently it is preferable to have the kennel 10 positioned or placed in a convenient manner within the home. Thus, in many circumstances the kennel 10 is predominately placed (e.g., the family room of a home), such that it visible to the residents and guests of a home. In such circumstances, it is desirable to have a kennel 10 with an improved aesthetic quality.

In one embodiment, the kennel 10 is a folding wire animal kennel 10 formed from six panels. As seen in FIG. 1, the animal kennel 10 includes an upper upright portion P1, a central upright portion P2 and a lower upright portion P3. In particular, the folding wire animal kennel 10 has a top panel 12, a bottom panel 14, a front panel 16, a back panel 18, a right panel 20 and a left panel 22. The front panel 16, the back panel 18, the right panel 20 and the left panel 22 are each separated by a vertical edge C. Each of the panels is formed by a grid like pattern of wires. For example, the front panel 16 is formed from a plurality of vertical wires 24 and a plurality of horizontal wires 26. The vertical and horizontal wires 24 and 26 are attached to each other in any manner desired (e.g., welding) and spaced at a suitable spacing that would prevent an animal or pet from escaping or passing through openings formed between the vertical and horizontal wires 24 and 26. Each of the panels is generally connected to an adjacent panel using any suitable device such as a connecting element 28 or a latching hook 29. However, it is noted that the panels can be attached in any suitable manner, and the panels can be permanently attached or semi-permanently attached such that the kennel 10 is not capable of folding, if desired.

In this embodiment, the front panel 16 includes an opening 30 that is sized and configured to enable an animal or pet to pass therethrough. Additionally, the front panel 16 has a door 32 coupled thereto. In one embodiment, the door 32 is pivotally coupled to the front panel 16 by bending at least one horizontal wire 34 of the door around a vertical wire 26 of the front panel 16 to form a looped portion 36. As shown in FIG. 1, the door 32 has four horizontal wires bent to form loop portions.

The door 32 is configured to pivot from an open position, enabling an animal or pet to pass through the opening to a closed position, preventing an animal or pet to pass therethrough. The door preferably includes at least one locking mechanism 38 to maintain the door 32 in the closed position and preventing an animal or pet from moving the door 32 to the open position. The locking mechanism can be disposed on the side of the door 32 opposite the looped portions 36; however, it is noted that the locking mechanism 38 can be disposed on any suitable side or portion of the door 32.

In one embodiment, the locking mechanism includes a horizontal locking bar 40 disposed on the door. The horizontal locking bar 40 is rotatable about a longitudinal axis and movable along the longitudinal axis from a locked position to an unlocked position and vice a versa. The locking bar 40 can be moved by a locking handle 42 and is attached to the door 32 via positioning loops 44. The locking bar 40 is configured to pass through a locking loop 46 attached to the front panel 16. Thus, to lock the door 32, the locking bar 40 is slid through the locking loop 46, preventing an animal or a pet from moving the door 32 to the open position. As shown in FIG. 1, the door 32 can include a plurality of locking mechanisms.

The kennel 10 can be collapsible or at least formed from several panels connected together. However, it is noted that the kennel 10 can be any sutiable kennel formed in any suitable manner. Generally, the bottom panel 14 has a pan 48 formed from plastic removeably disposed thereon, inside of the kennel 10.

As shown in FIG. 1, the kennel 10 includes a stamped metal decor (decorative panel) 50 extending around the exterior thereof. That is, extending about the outer surface of the sides (or panels 12-22) of the kennel 10 is a stamped metal decor (decorative panel) 50 that is a punched stamped metal panel. In one embodiment, decorative panel 50 is coupled or attached to the outer portion of the panels of the kennel 10.

In one embodiment, the decorative panel 50 can be an insert that extends about all the sides or a portion of the sides or in any manner desired. As shown in FIG. 1, the decorative panel 50 is disposed on the left and right panels 22 and 20 and the back panel 18 to form a generally continuous decorative panel. However, it is noted that the decorative panel 50 can be disposed on any panel or portion of panel desired.

The decorative panel 50 has a pattern or a decorative decor that improves the looks of the kennel 10. The decorative panel 50 can extend vertically along only a portion of the height of the kennel 10 or along the entire height of the kennel 10. It is noted that although the decorative panel 50 is preferably metal, the decorative panel 50 can be any suitable material. As shown in FIGS. 1, 2 and 6-9, the decorative panel 50 extends generally along the central portion of the left and right panels 22 and 20 and the back panel 18. Each decorative panel 50 has a rectangular shape with a length that is generally the same length as a respective kennel panel. In other words, the decorative panel 50 that is attached to the right side panel 20 as a length that is substantially the same as the length of the right side panel 20. Moreover, the decorative panel 50 that is attached to the back panel 18 has a length that is the same as the length of the back panel 18. However, the panel height, in these embodiments is less than the respective kennel panel height. Accordingly, the decorative panel 50 does not cover the top and bottom portions of these panels, forming a strip along a portion of the panels. In one embodiment, the height of the decorative panel 50 is about one-third the height of the panel on which the decorative panel 50 is disposed. Such a height increases the aesthetic appeal of the kennel 10, while enabling the pet or animal to see or be seen through the kennel panels. Accordingly, the decorative panel 50 increases the aesthetic appeal without completely enclosing the pet or animal. However, the height of the decorative panel 50 can be any suitable or desired height. In other words, if desired, the decorative panel 50 can be more or less than one-third the height of a respective panel.

Figure 5:
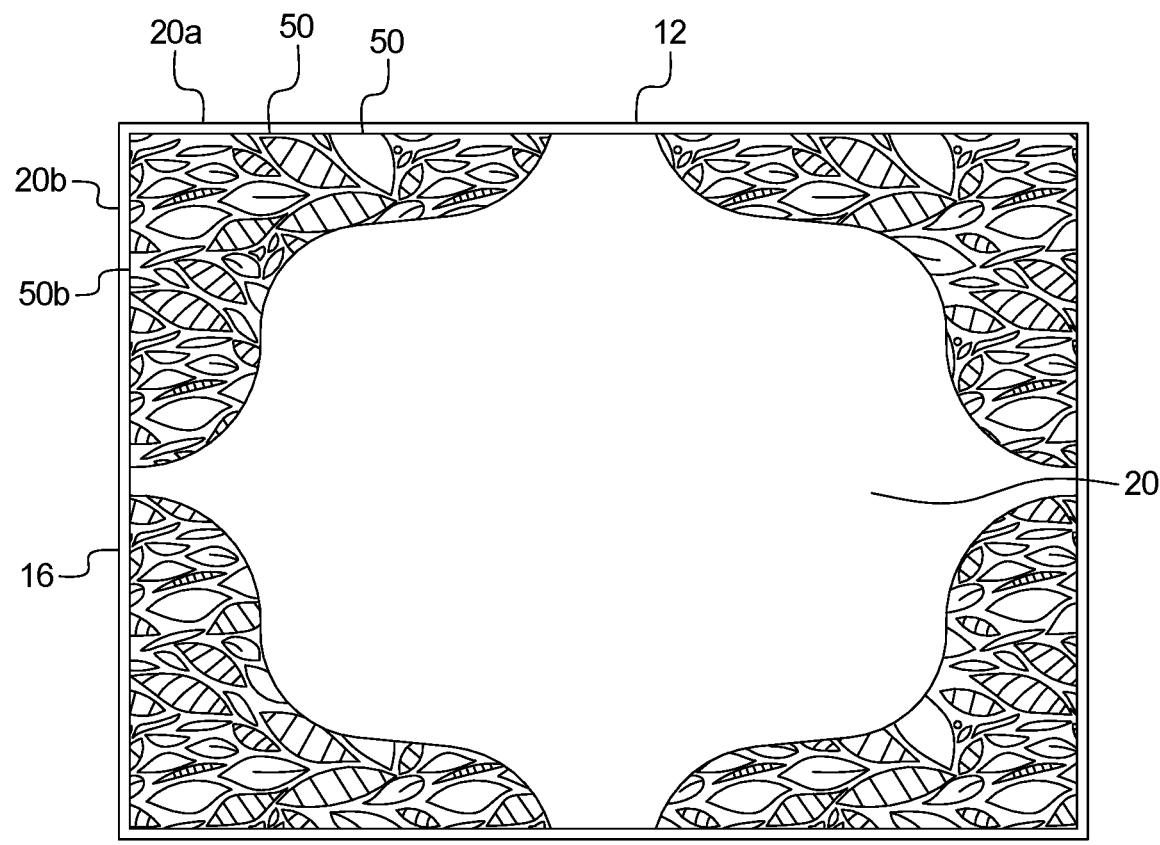
FIG. 5 is a plan view of another design of the decorative portion of the decorative kennel illustrated in FIG. 1.
Figure 9:
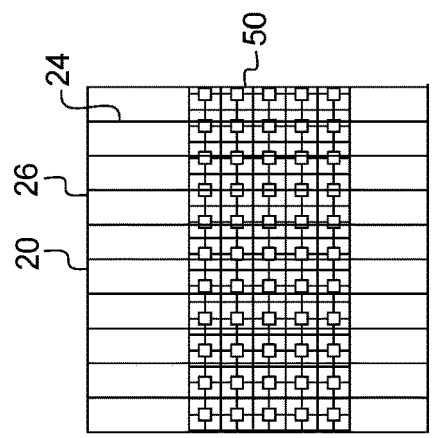
FIG. 9 is a plan view of another design of the decorative portion of the decorative kennel illustrated in FIG. 1.
Figure 8:
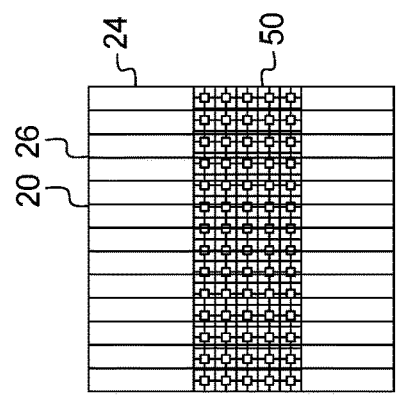
FIG. 8 is a plan view of another design of the decorative portion of the decorative kennel illustrated in FIG. 1.
Figure 7:
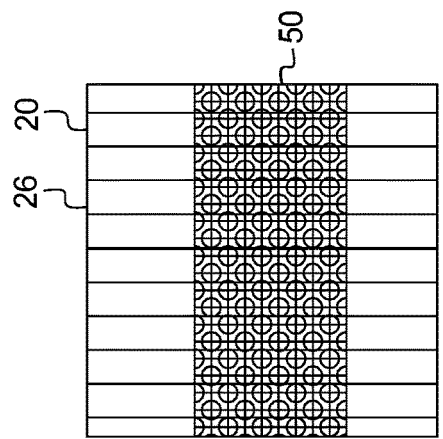
FIG. 7 is a plan view of another design of the decorative portion of the decorative kennel illustrated in FIG. 1.
Figure 6:
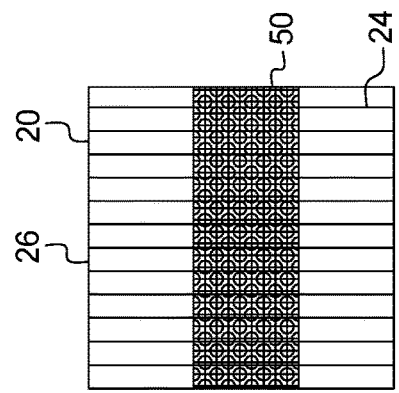
FIG. 6 is a plan view of another design of the decorative portion of the decorative kennel illustrated in FIG. 1.

As shown in FIG. 5, the decorative panel 50 can also have a generally triangular shape and be configured to be positioned in the corners of the kennel 10. That is, the decorative panel 50 can be configured to be attached to the corner of the right side panel 20 at a position where the right side panel 20 converges with the top panel 12 and the front panel 16. Thus, in this embodiment, a first side 50a of the decorative panel 50 is positioned adjacent and parallel to the top edge 20a of the right side panel 20, and a second side 50b of the decorative panel 50 (perpendicular to the first side 50a) is positioned adjacent and parallel to the front edge 20b of the right side panel 20. It is noted that in this embodiment, the decorative panel 50 can be disposed at any corner on any panel and on a plurality of corners of one panel of a plurality of panels. For example, a decorative panel 50 having a triangular shape can be positioned on the four corners of the right side panel 20 and left side panel 22, the back panel 18 and/or the front panel 16 and/or the top panel 12, or any combination thereof.

Figure 2:
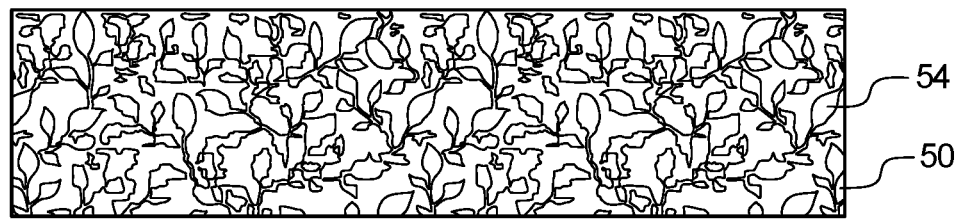
FIG. 2 is a plan view of a design of the decorative portion of the decorative kennel illustrated in FIG. 1.

Generally, the decorative panels are stamped metal and can have any pattern or imagery desired. See for example, FIGS. 2 and 4-8 illustrating various designs of the decorative panel. In one embodiment, the pattern or imagery is formed from the stamping, such that some portions of the panel are solid or opaque, while other portions are see through or missing. In other words, as shown in FIG. 2, the decorative panel 50 may be formed such that a leaf pattern 54 is stamped. In FIG. 2, the leaves are formed due to a lack of material. However, it is noted that the leaves can be formed by the presence of material, if desired. Moreover, the panel can be solid, with the pattern formed by etching, drawing, imprinting or in any other suitable manner.

Figure 3:
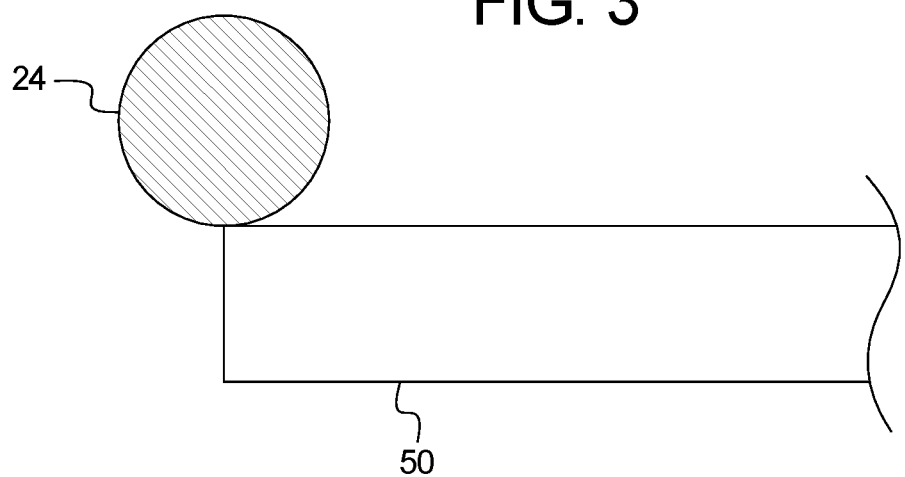
FIG. 3 is a sectional view of a decorative panel attached to a vertical wire.
Figure 4:
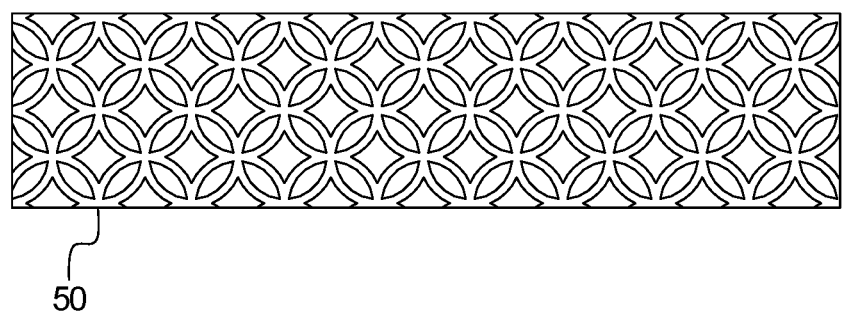
FIG. 4 is a plan view of another design of the decorative portion of the decorative kennel illustrated in FIG. 1.

In one embodiment, the decorative panel is welded to the vertical wires 24 of the kennel 10 to securely hold the panel in place; however, the decorative panel can be attached to the kennel 10 in any suitable manner. In one embodiment, as shown in FIG. 1, the decorative panel 50 extends over a plurality of vertical wires 24, and has each end of the panel welded or attached along the wire. That is, the first and second vertical edges 60 and 62 of the decorative panel 50 extend along respective vertical wires. If desired, the top and bottom edges can also extend along respective horizontal wires 26. Such a configuration eliminates any overhanging portion of the kennel 10 to reduce or eliminate any harm or damage that may be caused to the animal or owner by edges of the panel. In other words, the longitudinal vertical edges (e.g., edge 62) of the decorative panel 50 are aligned with a respective vertical wire 24 so as to be flush or adjacent thereto, as shown in FIG. 3. Accordingly, the edges 60 and 62 of the decorative panel 50 are smoothed by the round vertical wire 24.

Moreover, in one embodiment, the edges 60 and 62 of the decorative panel 50 can be slightly rounded to configured to reflect the vertical or horizontal wires 24 and 26 to which it is attached to reduce or eliminate any harm or damage that may be caused to the animal or owner by edges of the panel.

However, it is noted that the decorative panel 50 can be attached to the kennel 10 in any suitable manner. For example, the decorative panel 50 can be removable attached using brackets or any other suitable removable device, or the panel may permanently or semi-permanently fixed using any suitable device or method.

The decorative panel 50 preferably can soften the look of the wire kennel 10 by adding simple touches of texture, design and color. The design of the decorative panel 50 can be enhanced by adding hammer tone metal colors or with bright colors.

The kennels described herein can be positioned within a home or other area for an animal and be aesthetically pleasing to the owner and the animal.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claim and equivalents.

What is claimed is:

1. A kennel comprising:
    an enclosure comprising at least four sidewalls, the enclosure capable of housing an animal:
    a plurality of vertical wire members, each of the vertical wire members of the plurality of vertical wire members defining a vertical edge of each of the walls of the kennel, each of the plurality of vertical wire members being rigid,
    each of the sidewalls comprising:
        an upper upright portion,
        a central upright portion,
        a lower upright portion, the central upright portion being disposed between and adjacent to the upper upright portion and the lower upright portion when the kennel is in an upright position, the upper, central and lower upright regions being coplanar and each portion extending only one-third of the height of the sidewall;
    three of the sidewalls comprising a decorative panel extending between and being rigidly attached to two vertical edges of the respective sidewall, each decorative panel further being rigid and being welded to the respective vertical wire members in the central upright portion such that each decorative panel does not overhang the vertical edges of the respective sidewall; and
    a door being disposed on the fourth sidewall offset of each decorative panel, the door not comprising a decorative panel;
    wherein each decorative panel being only disposed in the central upright portion and not disposed in the upper upright portion and not disposed in the lower upright portion.

2. The kennel of claim 1, wherein
each decorative panel has a rectangular shape.

3. The kennel of claim 1, wherein
each of the plurality of decorative panels is disposed adjacent to another one of the plurality of decorative panels.

4. The kennel of claim 1, wherein
each decorative panel is made of stamped metal.

5. The kennel of claim 1, wherein
each decorative panel has a leaf pattern.

* * * * *